(12) United States Patent  
Camenisch et al.

(10) Patent No.: US 8,584,016 B2  
(45) Date of Patent: Nov. 12, 2013

(54) SYSTEM AND METHOD FOR VERIFYING AN ELECTRONIC DOCUMENT

(75) Inventors: Jan Leonhard Camenisch, Thalwil (CH); Thomas R. Gross, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 741 days.

(21) Appl. No.: 12/203,954

(22) Filed: Sep. 4, 2008

(65) Prior Publication Data

US 2009/0063986 A1 Mar. 5, 2009

(30) Foreign Application Priority Data

Sep. 4, 2007 (EP) .................................... 07115649

(51) Int. Cl.
*G06F 3/00* (2006.01)

(52) U.S. Cl.
USPC ............ 715/733; 715/741; 715/742; 715/743

(58) Field of Classification Search
USPC .......... 715/733, 741, 742, 743, 748, 751, 752
See application file for complete search history.

(56) References Cited

U.S. PATENT DOCUMENTS

| | | | | |
|---|---|---|---|---|
| 7,533,268 | B1 * | 5/2009 | Catorcini et al. ............. | 713/176 |
| 7,937,663 | B2 * | 5/2011 | Parker et al. .................. | 715/751 |
| 2001/0037367 | A1 * | 11/2001 | Iyer .............................. | 709/204 |
| 2002/0026584 | A1 | 2/2002 | Szubic | |
| 2002/0099733 | A1 * | 7/2002 | Teruuchi et al. ............. | 707/512 |
| 2003/0145017 | A1 * | 7/2003 | Patton et al. ................ | 707/104.1 |
| 2004/0006543 | A1 * | 1/2004 | Twining et al. ................ | 705/80 |
| 2004/0049515 | A1 * | 3/2004 | Haff et al. ..................... | 707/100 |
| 2004/0085354 | A1 * | 5/2004 | Massand ....................... | 345/751 |
| 2004/0133784 | A1 | 7/2004 | Tonnesland | |
| 2006/0101321 | A1 * | 5/2006 | Friedrichowitz et al. ..... | 715/500 |
| 2007/0050362 | A1 * | 3/2007 | Low et al. ......................... | 707/8 |
| 2007/0055596 | A1 * | 3/2007 | Yankovich et al. ............. | 705/35 |
| 2007/0186157 | A1 * | 8/2007 | Walker et al. ................. | 715/530 |

FOREIGN PATENT DOCUMENTS

| | | |
|---|---|---|
| JP | 06-250640 | 9/1994 |
| JP | 2003-501915 | 1/2003 |
| KR | 2004-0083988 | 10/2004 |
| WO | 2004/032414 | 4/2004 |

* cited by examiner

*Primary Examiner* — Enrique Iturralde
(74) *Attorney, Agent, or Firm* — William Stock; Anne Vachon Dougherty (57) ABSTRACT

A system for verifying an electronic document, including a first device comprising a first display, a first interface and a first displaying program for displaying the electronic document on the first display, a second device comprising a second display, a second interface and a second displaying program, a communication channel between the first interface and the second interface, wherein the first and the second device are operable to exchange the electronic document and wherein the system comprises a selection function, the selection function for selecting a part of the electronic document and generating position information of the selected part of the electronic document, and wherein the second displaying program is operable to lock the electronic document after the exchange with the first device and display the selected part of the electronic document on the second display.

18 Claims, 6 Drawing Sheets

SYSTEM AND METHOD FOR VERIFYING AN ELECTRONIC DOCUMENT

TECHNICAL FIELD

The present invention is related to a system for verifying an electronic document. The invention is further related to a corresponding method and a corresponding computer program.

BACKGROUND OF THE INVENTION

In electronic commerce, one of the common use cases is that a user signs an electronic document with her private key by means of an electronic signature. For instance, a user may sign a contract with a service provider or a transaction order at a bank. To be secure, such applications demand that the user can verify the statement she signs over a trusted device.

If such a transaction is done without a trusted device, malicious software such as viruses, Trojan horses etc. may manipulate the information the user sees or the information that is actually signed. Thus, the malicious software or ultimately a malicious party may engage in fraud against the user.

Because of practicability reasons such trusted devices are often very small, for instance, USB keys, Smart Cards, or small tamper proof card readers. Those devices come at best with small user interfaces and small screens.

Such small trusted user devices are often not tangible to show the whole content the user is actually signing. As an example a full contract the user is supposed to sign cannot be displayed on a trusted device that has only a display of a few square-centimeters. An example of such a small trusted device is the display of an EC-Card reader.

It is an object of the invention to provide other solutions for verifying an electronic document.

It is a further object of the invention to provide an improved system, an improved method and an improved computer program embodying solutions for verifying an electronic document.

SUMMARY AND ADVANTAGES OF THE INVENTION

The present invention is directed to a system, a method and a computer program as claimed in the independent claims.

Further embodiments of the invention are provided in the appended dependent claims.

According to a first aspect of the present invention, there is presented a system for verifying an electronic document, comprising
  a first device comprising a first display, a first interface and a first displaying program for displaying the electronic document on the first display,
  a second device comprising a second display, a second interface and a second displaying program,
  a communication channel between the first interface and the second interface, wherein the first and the second device are operable to exchange the electronic document and wherein the system comprises a selection function, the selection function being operable to
  select a part of the electronic document,
  generate position information of the selected part of the electronic document,
wherein the second displaying program is operable to
  lock the electronic document after the exchange with the first device,
  display the selected part of the electronic document on the second display based on the position information and on the locked electronic document.

The system according to this aspect of the invention comprises two displays. The first display can be used to display the electronic document in a common way. This may include to display the electronic document page by page and to display the pages of the electronic documents in different sizes and augmentations. The selection function is provided for selecting a part of the electronic document in order to display this selected part of the electronic document on the second display. In order to facilitate the displaying of the selected part of the document on the second display the selection function generates position information of the selected part of the electronic document. The position information comprises information with respect to the position of the selected part of the electronic document. In other words, the position information indicates which part of the electronic document has been selected for displaying on the second display.

The electronic document is exchanged between the first and the second device via the communication channel. This may be done by exchanging a data file of the electronic document. After the exchange the second device locks the electronic document. This may be done by storing the electronic document in a memory of the second device, in particular a secure memory. In other words, after the locking the first device has no access anymore to the electronic document that is stored in the second device. This prevents that viruses, worms or other tools that may run on the first device cannot change the electronic document stored in the second device anymore.

For displaying the selected part of the electronic document on the second display the second device uses only the electronic document that is locked in the second device and the position information, but not the electronic document stored in the first device. This has the advantage that a virus, a worm or other malicious activities on the first device cannot influence what is displayed on the second device. This allows for a verification of the electronic document. If a user of the system observes that there is a difference between the selected part on the second display and the corresponding part displayed on the first display, the user gets an indication that the first device is not working properly and that a verification of the electronic document should be denied. If a user of the system observes that a selected part on the second display and the corresponding part displayed on the first display are identical, another part of the electronic document may be chosen for verification. He may iterate this proceeding for any part of the electronic document that is of interest for him. This allows for verifying the complete electronic document.

According to an embodiment of this aspect of the invention the first displaying program comprises the selection function and the selection function is operable to send the position information to the second device.

According to this embodiment of the invention the selection function may use a movable window, a reading glass or other graphic elements for the selection. The user of the system may use the selection function to select one or more parts of the electronic document for verification. After the locking of the electronic document only the position information may be sent from the first device to the second device. The position information is used by the second displaying program for displaying the selected part of the electronic document on the second display. For displaying the selected part of the electronic document on the second display the second device uses only the electronic document that is locked in the second device and the received position information, but not the electronic document stored in the first device. If a user of the system observes that there is a difference between the selected part on the first display and the selected part on the second display, the user gets an indication that the first device is not working properly and that a verification of the electronic document should be denied. If a user of the system observes that the selected part on the first display and the selected part on the second display are identical, he may select another part of the electronic document for verification.

According to another embodiment of this aspect of the invention the second displaying program comprises the selection function and the selection function is operable to indicate to the user the position of the selected part by means of a user interface.

This embodiment of the invention has the advantage that no position information is exchanged between the first device and the second device. Rather the position of the selected part of the electronic document is indicated to the user by means of a user interface. As an example, the second display of the second device could be used as a visual interface. Furthermore, a loudspeaker could be used as an acoustical user interface. The user can receive the position information from the user interface, e.g. by looking at the second display or by listening to a loudspeaker of the second device. Then the user can verify the corresponding selected part on the first display by means of corresponding position information displayed on the first display. As an example, the selection function may generate line and/or page numbers as position information and display the line and/or page numbers of the selected part on the second display. The electronic document displayed on the first display comprises page and/or line numbers as well. This enables the user to identify the part on the first display that corresponds to the selected part by means of the line numbers and/or the page numbers displayed on the first display.

According to a further embodiment of the invention the selection function is operable for selecting automatically one or more parts of the electronic document.

The automatic selection may be implemented by predefining the parts that shall be selected by the selection function. As an example, it could be predefined that specific clauses of a contract should be selected by the selection function. As a further example, it might be predefined that specific fields of the electronic document should be selected by the selection function. This may be implemented by means of a parser. The selection function may select the predefined parts automatically in a sequential order. Between the sequential selection steps the user may be asked for a continuation confirmation.

According to an embodiment of this aspect of the invention the second device comprises a signature-function for executing an electronic signature on the electronic document.

This provides an improved device for performing electronic signatures. The user is enabled to verify the electronic document, in particular the parts that are of particular importance, before signing.

According to a further embodiment of this aspect of the invention the signature-function is operable to
- execute an electronic signature on the electronic document if the user indicates verification of the electronic document,
- reject the execution of an electronic signature if the user denies verification of the electronic document.

This provides an improved device for performing electronic signatures. The user may either verify the electronic document and sign it or refrain from a signature if he has observed discrepancies between the selected part displayed on the first device and the selected part displayed on the second device.

According to a further embodiment of this aspect of the invention the size of the second display is smaller than the size of the first display.

This is a cost efficient solution. It has the advantage that it enables the user to verify relatively large documents, e.g. a full contract, with a relatively small display. The first device with the larger first display can display the whole electronic document or pages of the electronic document. The second device with the smaller second display can display the selected parts of the electronic document.

According to a further embodiment of this aspect of the invention the second device is more tamper-proof than the first device.

This means that it is more difficult for an adversary to manipulate the second device than to manipulate the first device. In particular it is more difficult for an adversary to place a virus or worm or other tools on the second device than on the first device. This can be achieved by limiting the possibilities to load applications on the second device.

As tamper proof devices have often only limited display facilities and often small displays, the system according to this aspect of the invention offers the possibility to display large documents, e.g. a contract, on a large display of the first device, while verifying selected parts of the electronic document by means of the display of the second device.

According to a further embodiment of this aspect of the invention the second device is a trusted device.

A trusted device is understood as a device that the user has chosen to trust. Trusted devices may often have a relatively small display. The system according to this aspect of the invention offers the possibility to display large documents, e.g. a contract, on a large display of the first device, while verifying selected parts of the electronic document by means of the display of the trusted device.

According to a further embodiment of this aspect of the invention the first and the second device are operable to exchange position reference information.

Such position reference information facilitates that the second displaying program displays exactly the selected part of the electronic document. By means of the position reference information the first displaying program and the second displaying program agree on a common position reference system for the position of the selected part of the electronic document. As an example, the position reference information may be a 2-dimensional or 3-dimensional coordinate system or any other reference system that allows a common understanding of the position of parts of the electronic document between the first and the second displaying program.

According to a further embodiment of this aspect of the invention the communication channel is secure channel.

This enhances the security of the system. A secure channel is a channel that is resistant to interception and/or tampering to a predefined degree. A secure channel may be established e.g. by means of the Secure Socket Layer (SSL)-protocols or the Transport Layer Security (TLS)-protocols. Other asymmetric or symmetric cryptographic protocols may be used as well.

According to a further embodiment of this aspect of the invention the communication channel is a wireless channel.

This provides a flexible system. The wireless channel may be e.g. a wireless channel according to the Bluetooth or the Near Field Communication (NFC) standard.

According to a further embodiment of this aspect of the invention the second device is a smart card reader.

A smart card reader, also denoted as chip card reader or integrated circuit card reader, may be defined as a reader that can read information from smart cards. A smart card, also denoted as chip card or integrated circuit card may be defined as any pocket sized cards comprising one or more integrated circuits for processing information. Such smart card readers are widespread and can be used for electronic payment, e.g. EC-card readers, electronic signatures or various other purposes. This provides an efficient and flexible system.

According to a further embodiment of this aspect of the invention the second device is mobile phone.

This provides an efficient and flexible system.

According to a further embodiment of this aspect of the invention the second device comprises a trusted platform module (TPM) or a hardware-token.

A trusted platform module is an integrated circuit or electronic chip that conforms to the trusted platform module specification of the Trusted Computing Group (TCG). Details of the specification may be found on the Trusted Computing Group.org web site under groups/tpm.

A hardware token, also denoted as security token or cryptographic token, is an electronic device that can by used by a user of a computer system for authentication purposes. Hardware tokens are usually rather small so that they can be carried in a pocket of the user. Hardware tokens may store signature keys of the user that allows for performing electronic signatures.

According to a second aspect of the invention there is presented a method for verifying an electronic document, the method comprising the steps of:
- an exchange step for exchanging an electronic document between a first device and a second device,
- a locking step for locking the electronic document in the second device after the exchange step,
- a selection step for selecting a part of the electronic document,
- a position information generation step for generating position information of the selected part of the electronic document,
- a displaying step for displaying the electronic document on a first display of the first device by means of a first displaying program,
- a displaying step for displaying the selected part of the electronic document on a second display of the second device by means of a second displaying program based on the position information and on the locked electronic document.

According to an embodiment of this aspect of the invention the selection step and the position information generation step are performed by the first displaying program and the method further comprises a position information sending step for sending the position information from the first device to the second device.

The selection step according to this embodiment of the invention may involve some user interaction. As an example, the user may select by means of the selection function of the first displaying program parts of the electronic document that are of specific interest for him.

According to an embodiment of this aspect of the invention the selection step and the position information generation step are performed by the second displaying program and the method further comprises a position indication step for indicating to the user the position of the selected part by means of a user interface.

This has the advantage that the selection step may be performed automatically without user interaction.

According to an embodiment of this aspect of the invention the method further comprises a signature step for signing the electronic document if a user has verified the electronic document.

According to a third aspect of the invention there is presented a computer program comprising instructions for carrying out the steps of the method according to the second aspect of the invention.

Any disclosed embodiment may be combined with one or several of the other embodiments shown and/or described. This is also possible for one or more features of the embodiments.

Any feature of one aspect of the invention may be applied to another aspect of the invention and vice versa.

DESCRIPTION OF THE DRAWINGS

Preferred embodiments of the invention are described in detail below, by way of example only, with reference to the following schematic drawings.

The drawings are provided for illustrative purpose only and do not necessarily represent practical examples of the present invention to scale. In the figures, same reference signs are used to denote the same or like parts.

DETAILED DESCRIPTION OF THE INVENTION

Figure 1:
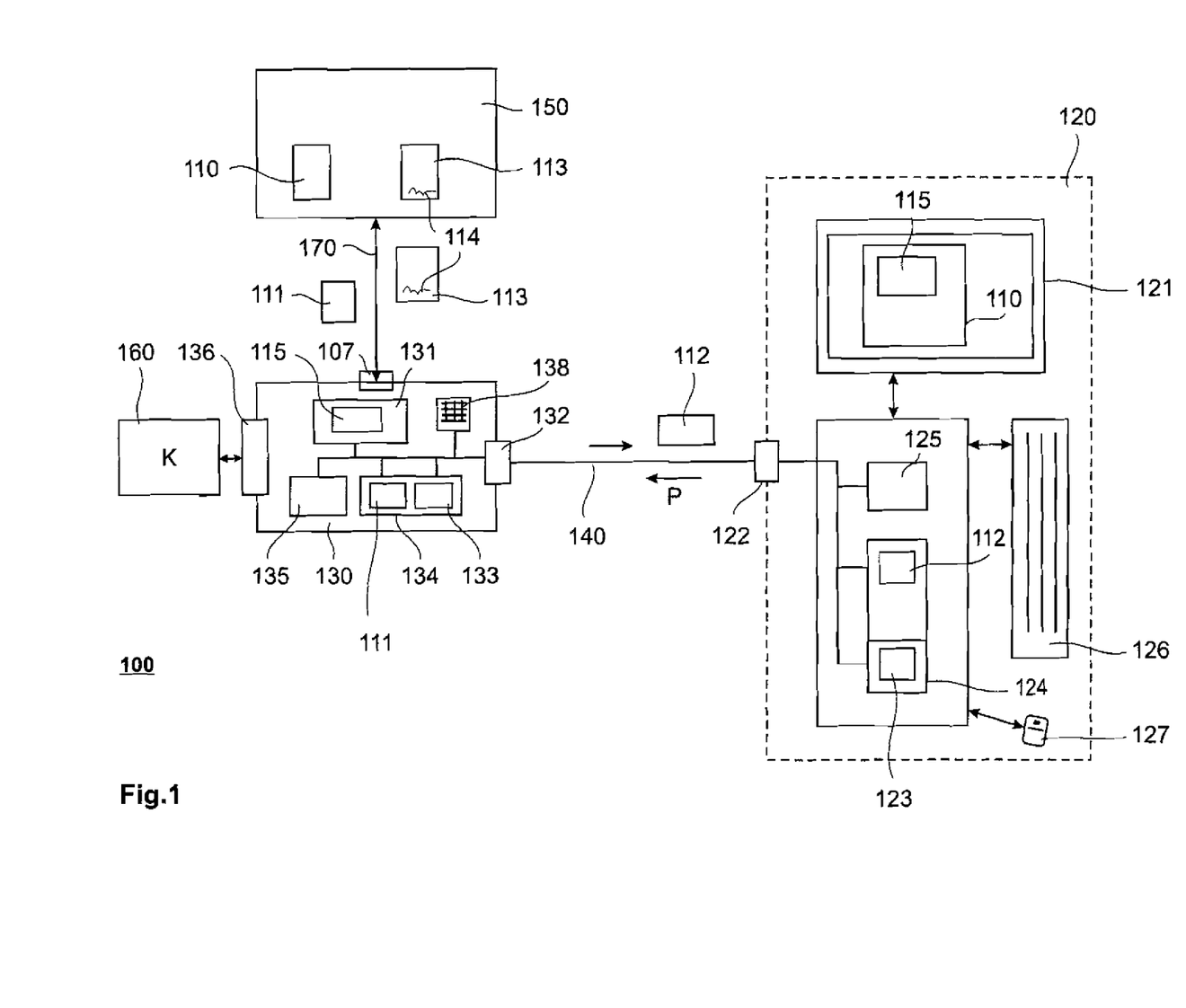
FIG. 1 shows a schematic illustration of a block diagram of a system for verifying an electronic document according to an embodiment of the invention.

FIG. 1 shows a schematic illustration of a system 100 for verifying an electronic document 110. The system 100 comprises a first device 120. The first device 120 comprises a first display 121, a first interface 122 and a first displaying program 123. The first displaying program 123 is stored in a memory unit 124. Furthermore, the first device 120 comprises a processing unit 125. The first device 120 comprises a keyboard 126 and a mouse 127 for providing user input to the first device 120. The processing unit 125, the memory unit 124 and the first interface 122 may be e.g. arranged in a desktop personal computer (PC) 128. As another example, the first device 120 may be a laptop computer.

The system 100 comprises a second device 130 comprising a second display 131, a second interface 132 and a second displaying program 133. The second displaying program 133 is stored in a memory unit 134. Furthermore, the second device 130 comprises a processing unit 135.

The first interface 122 and the second interface 132 are communication interfaces that are connected by means of a communication channel 140. The communication channel 140 may be a wired or a wireless channel. The wireless channel may be e.g. a wireless channel according to the Bluetooth or the Near Field Communication (NFC) standard.

The wired channel may be implemented by means of a network cable. The communication channel 140 may be a secure channel, i.e. a channel that is resistant to interception and/or tampering to a predefined degree. The security of the communication channel 140 may e.g. be implemented by means of the Secure Socket Layer (SSL)-protocols, the Transport Layer Security (TLS)-protocols or other asymmetric or symmetric cryptographic protocols.

The second device 130 comprises a third interface 136 and a fourth interface 137. The third interface 136 is operable to receive a smart card 160. The smart card 160 may comprise a signature key K for signing electronic documents such as the electronic document 110. The system 100 further comprises a signature receiving entity 150. The signature receiving entity 150 may be e.g. a bank, an insurance company, an internet shop or any other entity that may utilize electronic signatures. The signature receiving entity 150 is coupled to the fourth interface 137 by means of a communication channel 170. The communication channel 170 may be a wireless or a wired channel. In addition, the second device 130 comprises an input pad 138 for providing user input information to the second device 130.

The second device 130 may be e.g. a smart card reader, a mobile phone, a hardware-token or a smart card with a display.

The signature receiving entity 150 is operable to send a data file 111 of the electronic document 110 to the second device 130. The data file 111 of the electronic document 110 is stored in the memory unit 134.

The first device 120 and the second device 130 are operable to facilitate a verification of the electronic document 110. In order to verify the electronic document 110, the first device 120 and the second device 130 exchange the electronic document 110 or a copy of the electronic document 110 respectively via the communication channel 140. According to the embodiment of the invention as illustrated with respect to FIG. 1, the second device 130 sends a data file 112 of the electronic document 110 to the first device 120. The data file 112 may be generated as a copy of the data file 111 of the electronic document 110. Upon receipt, the first device 120 stores the data file 112 of the electronic document 110 in the memory unit 124. After the exchange of the electronic document 110, the data file 111 of the electronic document 110 that is stored in the memory unit 134 is locked. In other words, the data file 111 of the electronic document cannot be changed anymore until it is unlocked.

In operation, the first displaying program 123 can be used for displaying the electronic document 110 on the first display 121, based on the data file 112 stored in the memory unit 124. The first displaying program 123 comprises a selection function which allows the user to select a part 115 of the electronic document 110 for verification purposes. The user may perform the selection by means of the keyboard 126 and/or the mouse 127. Upon selection of a part 115 of the electronic document 110 displayed on the first display 121, the first displaying program 123 generates position information P of the selected part 115 of the electronic document 110. The position information P comprises information of the position of the selected part 115 of the electronic document 110. The first device 120 and the first displaying program 123 respectively send this position information P to the second device 130 via the first interface 122 and the communication channel 140. The position information P indicates to the second device 130 that the selected part 115 of the electronic document 110 has been selected by the user and should be displayed on the second display 131 of the second device 130. Upon receipt of the position information P, the second displaying program 133 of the second device 130 is operable to display the selected part 115 of the electronic document 110 on the second display 131. The second displaying program 133 utilizes and processes only the data file 111 of the electronic document 110 that is stored in the memory unit 134, also denoted as the locked electronic document 110, and the position information P received from the first device 120. In particular, the first device 120 cannot influence the data file 111 of the electronic document 110. After the exchange of the electronic document 110 between the first device 120 and the second device 130, i.e. after the data file 112 of the electronic document has been sent, the first device 120 and the second device 130 are provided for only exchanging the position information P until the verification has been completed. Hence once the electronic document 110, i.e. in this example the data file 111 of the electronic document 110, has been locked by the second device 130, a potential malicious application on the first device 110, e.g. a virus or a worm on the first device 120, cannot influence what is displayed on the second display 131. By means of the selection function of the displaying program 123 the user can select arbitrary parts 115 of the electronic document 110 and verify that the second display 131 shows the same selected part 115. As the parts 115 of the electronic document 110 that the user selects and thereby chooses for verification are independent from the first device 120, the user can select important parts 115 of the electronic document 110 and verify that they are correct. If a malicious software is running on the first device 120 and manipulates the view of the electronic document 110 on the first display 121, the user can observe a discrepancy or difference between the selected part 115 displayed on the first display 121 and the selected part 115 displayed on the second display 131.

If the user has verified the electronic document 110, he may sign the data file 111 of the electronic document 110. In order to execute a signature on the data file 111, the user provides the smart card 160 to the third interface 136. The second device 130 reads the signature key K for signing the electronic documents 110 from the smart card 160 and signs the data file 111 of the electronic document 110 by means of the signature key K. This results in a data file 113 of the electronic document 110 that comprises an electronic signature 114. The data file 113 represents a signed version of the electronic document 110. The data file 113 is then sent via the fourth interface 137 and the communication channel 170 to the signature receiving entity 150. The signature receiving entity 150 may store and/or further process the data file 113, also denoted as the signed electronic document 113.

In this exemplary embodiment of the invention the size of the second display 131 is smaller than the size of the first display 121. The user can use the first display 121 to show the complete electronic document 110 or pages of the electronic document 110, while verifying selected parts of the electronic document 110 on the second display 131.

The second device 130 is a trusted device and more tamper-proof than the first device 120.

Figure 2:
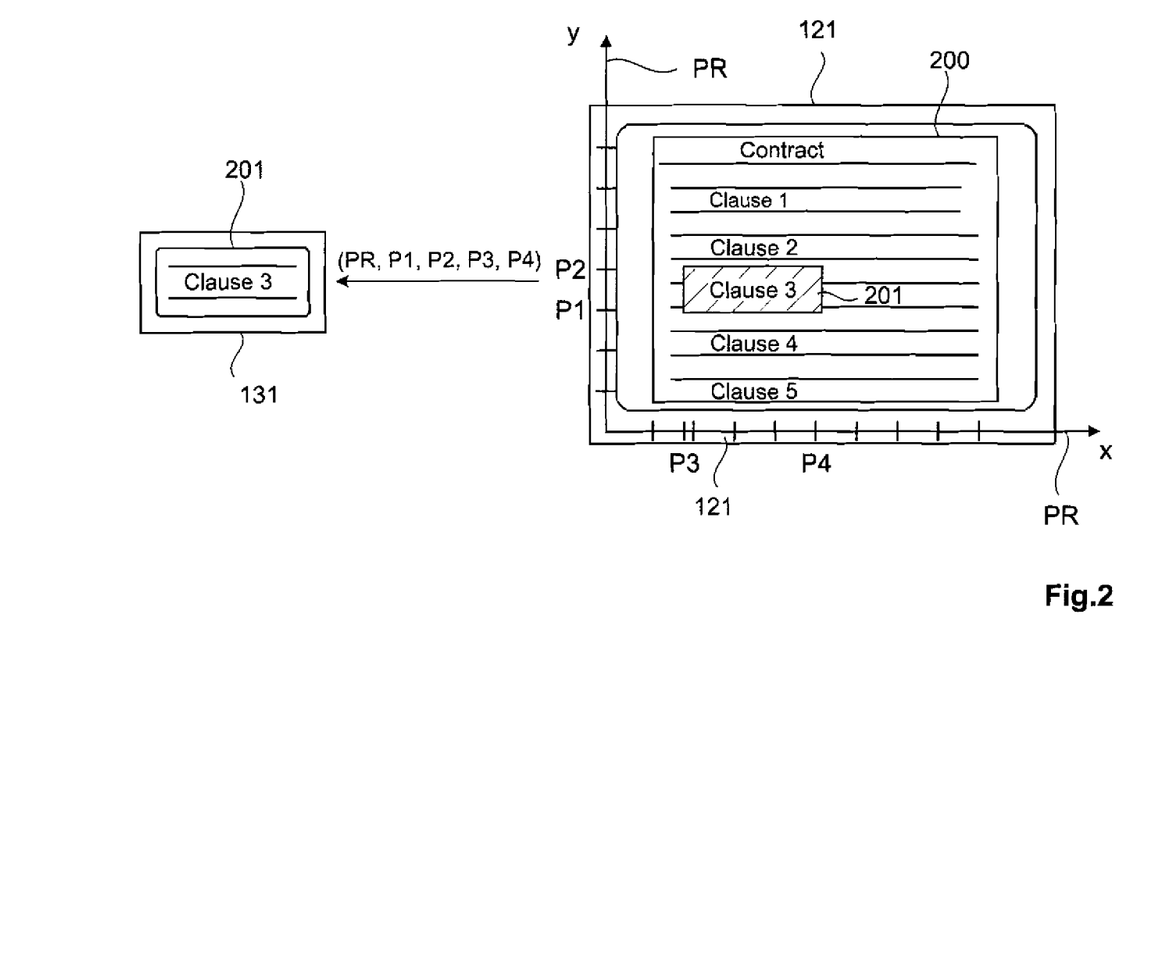
FIG. 2 shows a schematic illustration of an example view on a first display and a corresponding view on a smaller second display.

FIG. 2 illustrates an example view on the first display 121 and a corresponding view on the second display 131. On the first display 121 there is shown and displayed respectively a page 200 of a contract comprising 5 clauses clause 1, clause 2, clause 3, clause 4 and clause 5. The view on the first display 121 is generated by the first displaying program 123 and based on the data file 112 of the electronic document 110 stored in the memory unit 124.

In other words, in this example the electronic document 110 is a contract. As illustrated by means of the shaded box, the user has selected by means of the first displaying program 123 a part 201 of the electronic document 110 for verification.

The selected part 201 consists only of the clause 3 which may be of particular importance for the user. Accordingly the first displaying program 123 has generated position information P that indicates the position of the selected part 201. The position information P is referenced to position reference information PR. The position reference information PR defines a common position reference system for the first displaying program 123 and the second displaying program 133 in order to display the selected part 201 of the electronic document 110 on the second display 131. In this example, the position reference information PR is a 2-dimensional coordinate system comprising an X-axis and a Y-axis. The position information P comprises position points P1 and P2 indicating the lower and the upper position of the selected part 201 on the Y-axis as well as position points P3 and P4 indicating the left and the right position of the selected part 201 on the X-axis.

The position information P comprising the position points P1, P2, P3 and P4 as well as the position reference information PR is sent from the first device 120 to the second device 130. The second displaying program 133 generates a view of the selected part 201 on the second display 131 based on the data file 111 of the electronic document 110 stored in the memory unit 134 of the second device 130. Hence on the second display 131 there is shown and displayed respectively only the selected part 201 (clause 3) of the page 200 of the electronic document 110. By comparing the two views and checking if they are identical, the user can verify the electronic document 110 and ensure that no malicious software has altered the view on the first display 121.

According to another exemplary embodiment of the invention the second displaying program 133 comprises the selection function and the selection function is operable to indicate to the user the position of a selected part 115 on the second display 131. The selection function is operable for selecting automatically one or more selected parts 115 of the electronic document 110. The selected parts 115 may be pre-selected according to a predefined scheme.

Figure 5:
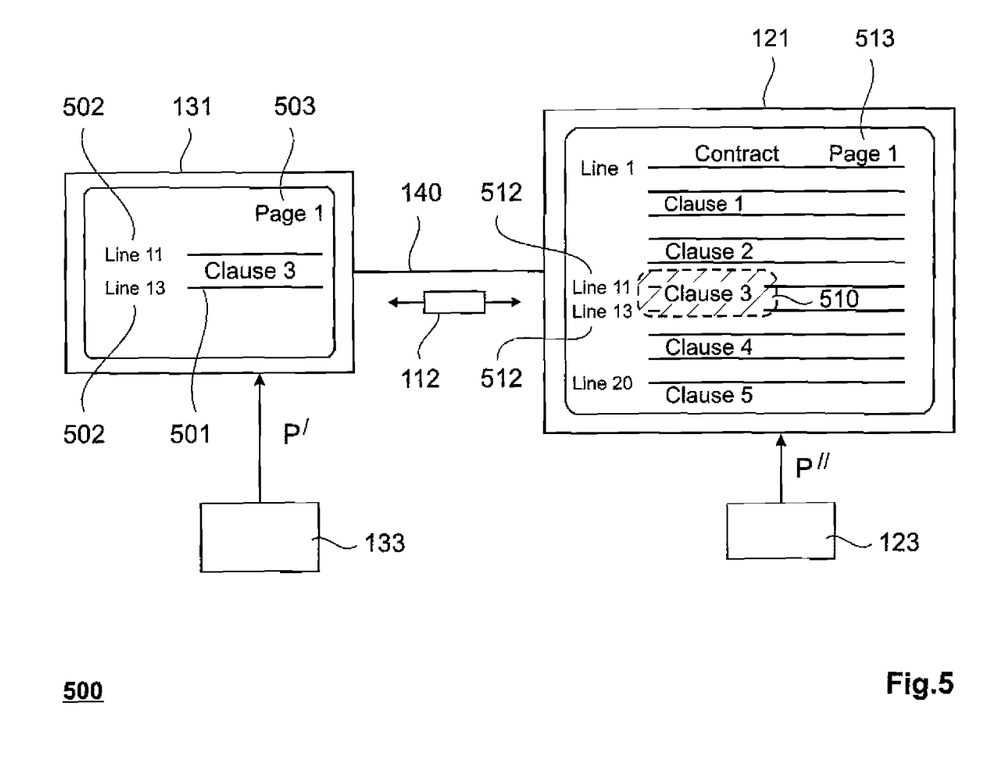
FIG. 5 shows a schematic illustration of a further example view on the first display and a corresponding view on the smaller second display.

This is illustrated in more detail in FIG. 5 showing another system 500 for verifying an electronic document. FIG. 5 illustrates an example view on the first display 121 and a corresponding view on the second display 131 of the system 500. In FIG. 5, same reference signs as in FIG. 1 are used to denote the same or similar parts.

According to this exemplary embodiment of the invention position information P' is generated by the second displaying program 133 and displayed on the second display 131.

On the second display 131 there is shown and displayed respectively a selected part 501 of an electronic document 110 comprising as selected part 501 a clause 3 of the electronic document 110. The electronic document 110 is in this example a contract. The selected part 501 (clause 3) has been automatically selected by the selection function of the second displaying program 133. In addition to the selected part 501, the second displaying program 133 displays as position information P' line numbers 502 in order to indicate to the user the position of the selected part 501. The position information P' further comprises a page number 503.

The view on the first and larger display 121 shows a complete page of the electronic document 110, comprising 5 clauses clause 1, clause 2, clause 3, clause 4 and clause 5. The view on the first display 121 is generated by the first displaying program 123 and based on the data file 112 of the electronic document 110 stored in the memory unit 124. The first displaying program 123 is operable to display position information P''' on the first display 121. In this example, there are displayed as position information P''' line numbers 512 (lines 1 to 20) and a page number 513 in order to enable the user to identify the corresponding part 510 that corresponds to the selected part 501.

The user of the system 500 may verify the selected part 501 by checking whether the selected part 501 displayed on the second display 131 and the corresponding part 510 displayed on the first display 121 are the same. This checking may involve some user interactions by means of the keyboard 126 and/or the mouse 127. The user may scroll by means of the keyboard 126 and/or the mouse 127 to the corresponding part 510 and compare it with the selected part 501 of the second display 131. Furthermore, the user may magnify the corresponding part 510 on the first display 131. The user gets the position of the selected part 501 from the position information 502 (line numbers) and the position information 503 (page numbers) displayed on the second display 131. He may then identify the corresponding part 510 that corresponds to the selected part 501 by means of the corresponding position information 512 (line numbers) and 513 (page number) displayed on the first display 121, i.e. in this example by looking at the corresponding lines 11-13 of the electronic document 110 displayed on the first display 121. If the selected part 501 and the corresponding part 510 are the same, the user may give a respective indication (confirmation) to the second displaying program 133, e.g. by means of the input pad 138. The second displaying program 133 may then automatically select another part 501 for verification and the user may verify it by comparing it with the corresponding part 510 displayed on the first display 121. This can be repeated several times. The number of selected parts 501 that are automatically selected by the second displaying program 133 may be predefined.

According to the embodiment of the invention as illustrated with reference to FIG. 5, the position information P' and P''' are not exchanged via the communication channel 140. Rather the position information P' is generated by the second displaying program 133 and provided to the user by showing the position information P' on the second display 131. Furthermore, the corresponding position information P''' is displayed by the first displaying program 123. According to this exemplary embodiment of the invention only a data file 112 of the electronic document 110 is exchanged via the communication channel 140.

Figure 3:
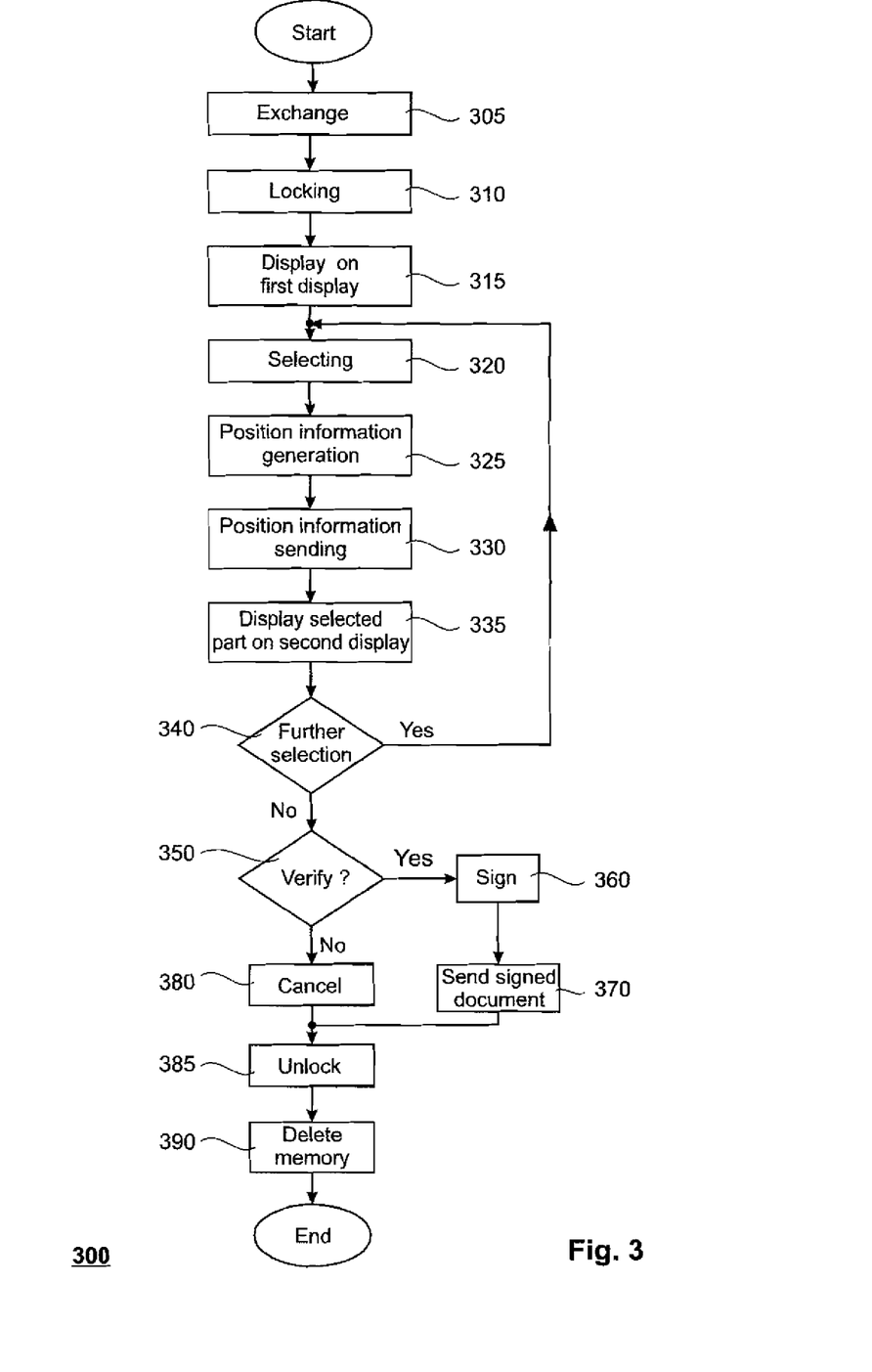
FIG. 3 shows a flow chart of a method for verifying an electronic document.

FIG. 3 shows a flow chart of a method for verifying the electronic document 110 by means of a system as described with reference to FIG. 1. The method starts with an exchange step 305 for exchanging the electronic document 110 between the first device 120 and the second device 130. In a subsequent locking step 310 the electronic document 110 is locked in the second device 130. This can be implemented by providing that after the exchange step 305 the version or data file of the electronic document 110 that is stored in the second device 130 cannot be changed or influenced anymore by the first device 120.

In a displaying step 315 the electronic document 110 is displayed on the first display 121 of the first device 120. In a selection step 320 a part of the electronic document is selected by the user. In a position information generation step 325 the position information P of the selected part 115 of the electronic document 110 is generated. In a position information sending step 330 the position information P is sent from the first device 120 to the second device 130. In a further displaying step 335 the selected part 115 of the electronic document 110 is displayed on the second display 131 of the second device 130 based on the position information P received from the first device 120 and on the locked electronic document 110.

In a decision step 340 the user is asked whether he would like to select another part of the electronic document 110. If yes, the method is continued with the selection step 320. The selection step 320, the position information generation step 325, the position information sending step 330 and the displaying step 335 may be repeated several times in an iterative manner. If the user indicates that he does not want to select another part of the electronic document 110, the user is asked in a decision step 350 whether he wants to verify the electronic document 110 and sign the electronic document 110. If yes, in a signature step 360 the second device 130 signs the data file 111 of the electronic document 110, resulting in the data file 113. In a signature sending step 370 the data file 113 of the electronic document 110 that comprises the electronic signature 114 is sent to the signature receiving entity 150. If the user does not want to verify and sign the data file 111, e.g. because he has identified discrepancies between the view on the first display 121 and the view on the second display 131, the verification and signing process is cancelled in a cancel step 380. After the cancel step 380 or the signature sending step 370 the data file 111 of the electronic document 110 is unlocked in a step 385 and deleted from the memory unit 134 in a step 390.

Figure 4:
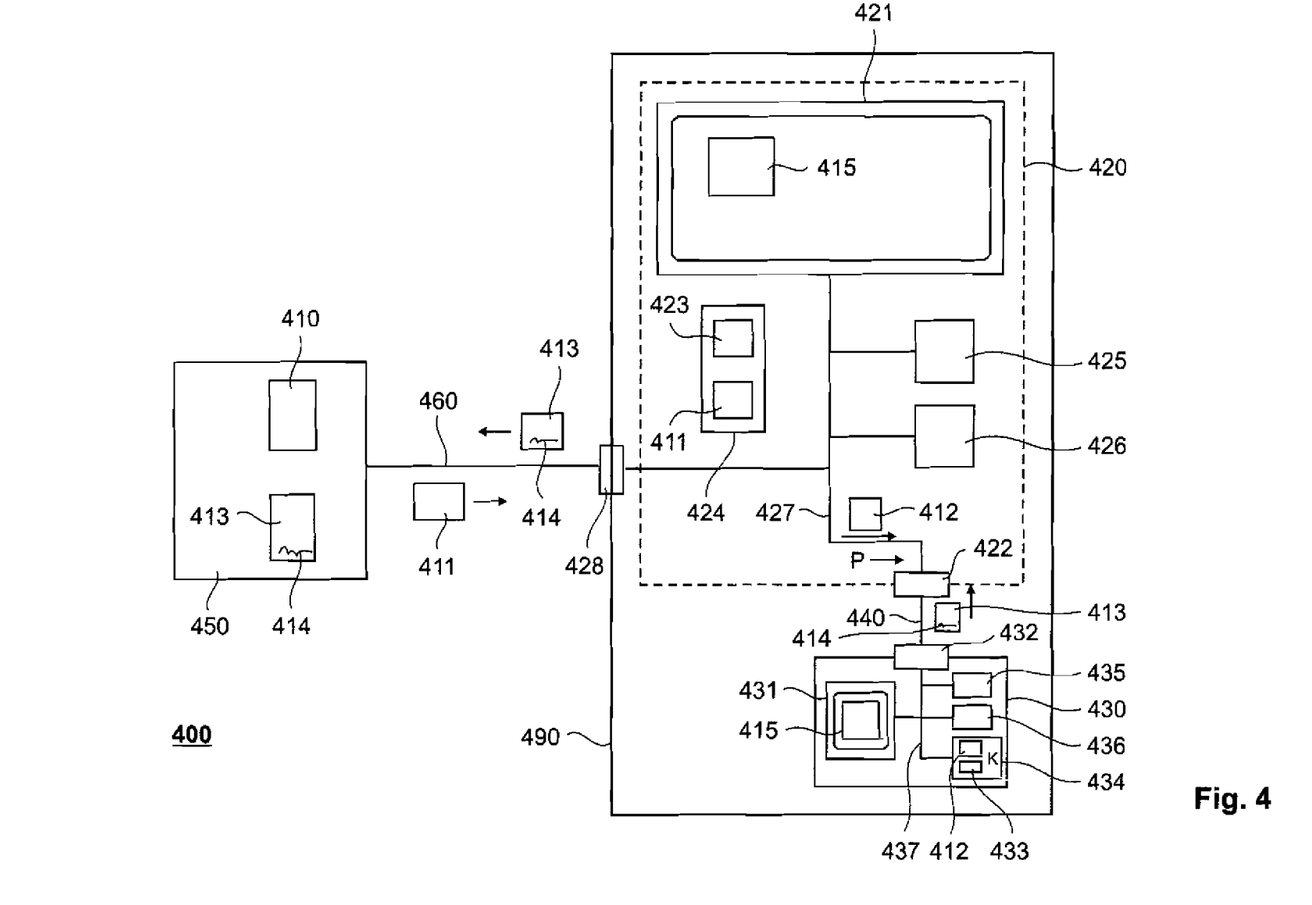
FIG. 4 shows a schematic illustration of a block diagram of a system for verifying an electronic document according to another embodiment of the invention.

FIG. 4 shows a schematic illustration of a system 400 for verifying an electronic document 410. The system 400 comprises a first device 420. The first device 420 comprises a first display 421, a first interface 422 and a first displaying program 423. The first displaying program 423 is stored in a memory unit 424. Furthermore, the first device 420 comprises a processing unit 425. The first device 420 comprises user input means 426 such as a keyboard and/or a mouse for providing user input to the first device 420. The first display 421, the first interface 422, the memory unit 424, the processing unit 425 and the user input means 426 are coupled by means of a bus system 427.

The system 400 comprises a second device 430 comprising a second display 431, a second interface 432 and a second displaying program 433. The second displaying program 433 is stored in a memory unit 434. The memory unit 434 is further provided for storing a signature key K. Furthermore, the second device 430 comprises a processing unit 435 and input means 436 such as a keyboard or one or more buttons. The second display 431, the second interface 432, the memory unit 434, the processing unit 435 and the input means 436 are coupled by means of a bus system 437.

The first device 420 and the second device 430 establish a computing system 490. The computing system 490 may be e.g. implemented as a laptop, notebook or portable computer. The computing system 490 may be arranged in a common housing or as separate parts e.g. of a desktop computer system. The second device 430 may be e.g. a smart card reader, a mobile phone, a hardware-token or a smart card with a display.

The first interface 422 and the second interface 432 are connected by means of a communication channel 440. The communication channel 440 may be a wired or a wireless channel. The wireless channel may be e.g. a wireless channel according to the Bluetooth or the Near Field Communication (NFC) standard. The wired channel may be e.g. implemented by means of a network cable or a printed line of a printed circuit board.

The first device 420 comprises a third interface 428 that is coupled to the bus system 427 and via a communication channel 460 to a signature receiving entity 450. The communication channel 460 may be a wireless or a wired channel. The communication channel 460 may be e.g. an Internet-connection. The signature receiving entity 450 may be e.g. a bank, an insurance company, an internet shop or any other entity that may utilize electronic signatures. The signature receiving entity 450 is operable to send a data file 411 of the electronic document 410 to the first device 420. This may happen during an internet session of a user of the computing system 490. The user may browse the internet page of the signature receiving entity 450 and may want to perform a transaction with the signature receiving entity 450. In response, the signature receiving entity 450 sends the data file 411 to the first device 420. The first device 420 stores the data file 411 in the memory unit 424. In a following verification session the first device 420 and the second device 430 can assist the user to verify the electronic document 410. In order to verify the electronic document 410, the first device 420 sends a data file 412 of the electronic document 410 to the second device 430, e.g. by making a copy of the data file 411 and send it via the bus system 427 to the second device 430. Upon receipt, the second device 430 stores the data file 412 of the electronic document 410 in the memory unit 434. After the exchange of the electronic document 410, the data file 412 of the electronic document 410 that is stored in the memory unit 434 is locked. In other words, the data file 412 of the electronic document cannot be changed anymore until it is unlocked.

In operation, the first displaying program 423 can be used for displaying the electronic document 410 on the first display 421, based on the data file 411 stored in the memory unit 424. The first displaying program 423 comprises a selection function which allows the user to select a part 415 of the electronic document 410 for verification purposes. The user may perform the selection by means of the input means 426. Upon selection of the part 415 of the electronic document 410 displayed on the first display 421, the first displaying program 423 generates position information P of the selected part 415 of the electronic document 410. The position information P comprises information of the position of the selected part 415 of the electronic document 410. The first device 420 and the first displaying program 423 respectively send this position information P to the second device 430 via the bus system 427, the first interface 422 and the communication channel 440. The position information P indicates to the second device 430 that the selected part 415 of the electronic document 410 has been selected by the user and should be displayed on the second display 431 of the second device 430. Upon receipt of the position information P, the second displaying program 433 of the second device 430 is operable to display the selected part 415 of the electronic document 410 on the second display 431. The second displaying program 433 utilizes and processes only the data file 412 of the electronic document 410 that is stored in the memory unit 434, also denoted as the locked electronic document 410, and the position information P received from the first device 420. In particular, the first device 420 cannot influence the data file 412 of the electronic document 410. After the exchange of the electronic document 410, i.e. in this example after the data file 412 has been received by the second device 430, the first device 420 and the second device 430 are provided for only exchanging the position information P until the verification has been completed. Hence once the electronic document 410, i.e. in this example the data file 412 of the electronic document 410, has been locked by the second device 430, a potential malicious application on the first device 420, e.g. a virus or a worm on the first device 420, cannot influence what is displayed on the second display 431. By means of the selection function of the displaying program 423 the user can select arbitrary parts 415 of the electronic document 410 and verify that the second display 431 shows the same selected part 415. As the parts 415 of the electronic document 410 that the user selects and thereby chooses for verification are independent from the first device 420, the user can select important parts 415 of the electronic document 410 and verify that they are correct. If a malicious software is running on the first device 420 and manipulates the view of the electronic document 410 on the first display 421, the user can observe a discrepancy or difference between the selected part 415 displayed on the first display 421 and the selected part 415 displayed on the second display 431.

If the user has verified the electronic document 410, he may sign the data file 412 of the electronic document 410. In order to execute a signature on the data file 412, the user may push a signature button of the input means 436. The second device 430 reads the signature key K from the memory unit 434 and signs the data file 412 of the electronic document 410 by means of the signature key K. This results in a data file 413 of the electronic document 410 that comprises an electronic signature 414. The data file 413 represents a signed version of the electronic document 410. The data file 413 is then sent via the second interface 432, the communication channel 440, the first interface 422, the bus system 427, the third interface 428 and the communication channel 460 to the signature receiving entity 450. The signature receiving entity 450 may store and/or further process the data file 413, also denoted as the signed electronic document 413.

The second device 430 comprises a higher security level and is more tamper-proof than the first device 420. Furthermore, the size of the second display 431 is smaller than the size of the first display 421. The user can use the first display 421 to show the complete electronic document 410 or pages of the electronic document 410, while verifying selected parts of the electronic document 410 on the second display 431.

Figure 6:
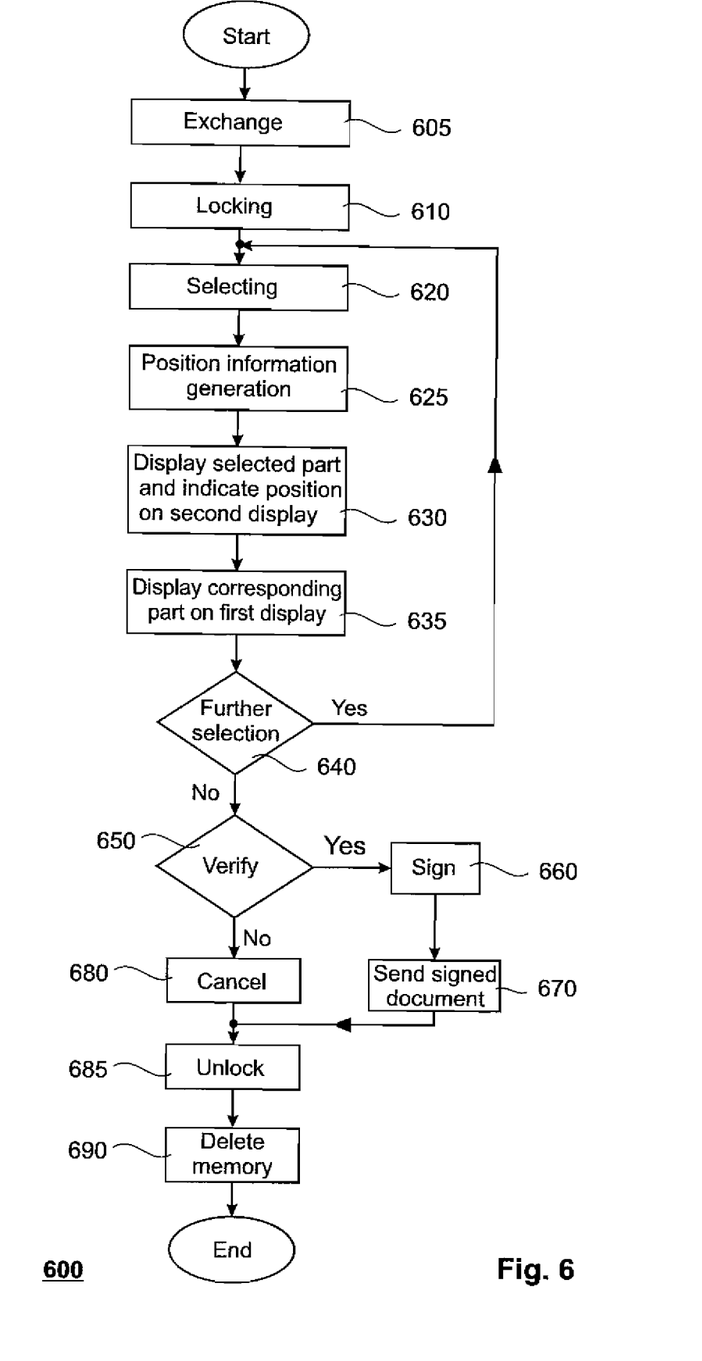
FIG. 6 shows a flow chart of a method for verifying an electronic document according to another embodiment of the invention.

FIG. 6 shows a flow chart of a method for verifying the electronic document 110 by means of a system as described with reference to FIG. 5 and FIG. 1. The method starts with an exchange step 605 for exchanging the electronic document 110 between the first device 120 and the second device 130. In a subsequent locking step 610 the electronic document 110 is locked in the second device 130. This can be implemented by providing that after the exchange step 605 the version or data file of the electronic document 110 that is stored in the second device 130 cannot be changed or influenced anymore by the first device 120. In a selection step 620 a part of the electronic document 110 is automatically selected by the second displaying program 133. In a position information generation step 625 the position information P' of the selected part 501 of the electronic document 110 is generated by the second displaying program 133. In a displaying and position indication step 630 the selected part 501 and the position information P' are displayed on the second display 131. In a displaying step 635 the electronic document 110 is displayed on the first display 131, based on the data file 112 stored in the memory unit 124. Furthermore, in the displaying step 635 the position information P''' is displayed on the first display 131. By means of the position information P' displayed on the second display 131 and the position information P''' displayed on the first display 121 the user can compare the selected part 501 and the corresponding part 510 and verify that they are the same. In a decision step 640 the user is asked whether he would like to select another part of the electronic document 110. If yes, the method is continued with the selection step 620, i.e. the second displaying program 133 selects automatically another selected part 501, e.g. clause 5. The selection step 620, the position information generation step 625, the displaying and position indication step 630 and the displaying step 635 may be repeated several times in an iterative manner.

If the user indicates that he does not want to select another part of the electronic document 110, the user is asked in a decision step 650 whether he wants to verify the electronic document 110 and sign the electronic document 110. If yes, in a signature step 660 the second device 130 signs the data file 111 of the electronic document 110, resulting in the data file 113. In a signature sending step 670 the data file 113 of the electronic document 110 that comprises the electronic signature 114 is sent to the signature receiving entity 150. If the user does not want to verify and sign the data file 111, e.g. because he has identified discrepancies between the view on the first display 121 and the view on the second display 131, the verification and signing process is cancelled in a cancel step 680. After the cancel step 680 or the signature sending step 670 the data file 111 of the electronic document 110 is unlocked in a step 685 and deleted from the memory unit 134 in a step 690.

Exemplary embodiments of the invention have been described above purely by way of example and modifications of detail can be made within the scope of the invention.

Any disclosed embodiment may be combined with one or several of the other embodiments shown and/or described. This is also possible for one or more features of the embodiments.

Additional Embodiment Details

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The invention claimed is:

1. A system for verifying an electronic document generated by an outside entity, comprising:
   a first device comprising a first display, a first interface and a first displaying program for displaying a version of an electronic document on the first display;
   a second device comprising a second display, a second interface and a second displaying program wherein the second display is capable of displaying only a part of the electronic document, wherein neither the first device nor the second device are under the control of the outside entity; and
   a communication channel between the first interface and the second interface, wherein the first and the second device are operable to exchange an electronic document, wherein at least one of the first and the second displaying program comprises a selection function, the selection function being operable to
   select a part of the electronic document, wherein the selection function comprises a parser and is operable for automatically parsing and selecting one or more parts of the electronic document;
   automatically generate position information of the selected part of the electronic document comprising position reference information and position points indicating upper and lower positions and left and right positions of the selected part,
   wherein the second displaying program is operable to
   lock the electronic document after the exchange with the first device,
   display the selected part of the locked electronic document on the second display based on the position information and on the locked electronic document to allow a user to compare the selected part of the locked electronic document displayed on the second display to the same part of the version of the electronic document displayed on the first display for verification of the electronic document.

2. The system according to claim 1, wherein the first displaying program comprises the selection function and the selection function is operable to send the position information to the second device.

3. The system according to claim 1, wherein the second displaying program comprises the selection function and the selection function is operable to indicate to the user the position of the selected part by means of a user interface.

4. The system according to claim 1, wherein the second device comprises a signature-function for executing an electronic signature on the electronic document.

5. The system according to claim 4, wherein the signature-function is operable to
   execute an electronic signature on the electronic document if a user indicates verification of the electronic document,
   reject the execution of an electronic signature if the user denies verification of the electronic document.

6. The system according to claim 1, wherein the first device has at least one security feature to prevent tampering with an electronic document and the second device includes at least one more security feature than the first device.

7. The system according to claim 1, wherein the second device is a trusted device.

8. The system according to claim 1, wherein the first and the second device are operable to exchange position reference information.

9. The system according to claim 1, wherein the communication channel is a secure channel.

10. The system according to claim 1, wherein the communication channel is a wireless channel.

11. The system according to claim 1, wherein the second device comprises a smart card reader.

12. The system according to claim 1, wherein the second device is a mobile phone.

13. The system according to claim 1, wherein the second device comprises a trusted platform module (TPM) or a hardware-token.

14. A method for verifying an electronic document generated by an outside entity, the method comprising the steps of:
   exchanging the electronic document between a first device and a second device, wherein neither the first device nor the second device are under the control of the outside entity, the first device being adapted for displaying a version of an electronic document on a first display and the second device being adapted for displaying only a part of the electronic document on a second display;
   locking the electronic document at the second device after said exchanging;
   selecting a part of the electronic document by automatically parsing the electronic document to automatically select one or more parts of the electronic document;
   automatically generating position information for the selected part of the electronic document comprising position reference information and position points indicating upper and lower positions and left and right positions of the selected part; and
   displaying the selected part of the locked electronic document on a second display of the second device by means of a second displaying program based on the position information and on the locked electronic document to allow a user to compare the selected part of the locked electronic document displayed on the second display to the same part of the version of the electronic document displayed on the first display for verification of the electronic document.

15. The method according to claim 14, wherein the selecting and the generating of position information are performed by the first displaying program and wherein the method further comprises a position information sending step for sending the position information from the first device to the second device.

16. The method according to claim 14, wherein the selecting and the generating of position information are performed by the second displaying program and wherein the method further comprises a position indication step for indicating to a user the position of the selected part by means of a user interface.

17. The method according to claim 14 further comprising a signature step for signing the electronic document if a user has verified the electronic document.

18. A non-transitory computer-readable storage medium storing instructions for carrying out the steps of the method for verifying an electronic document generated by an outside entity, the method comprising the steps of:
   exchanging the electronic document between a first device and a second device, wherein neither the first device nor the second device are under the control of the outside entity, the first device being adapted for displaying a version of an electronic document on a first display and the second device being adapted for displaying only a part of the electronic document on a second display;

locking the electronic document at the second device after said exchanging;

selecting a part of the electronic document by automatically parsing the electronic document to automatically select one or more parts of the electronic document;

automatically generating position information for the selected part of the electronic document comprising position reference information and position points indicating upper and lower positions and left and right positions of the selected part; and displaying the selected part of the locked electronic document on a second display of the second device by means of a second displaying program based on the position information and on the locked electronic document to allow a user to compare the selected part of the locked electronic document displayed on the second display to the same part of the version of the electronic document displayed on the first display for verification of the electronic document.

* * * * *